United States Patent
Alme

(10) Patent No.: US 9,246,938 B2
(45) Date of Patent: Jan. 26, 2016

(54) SYSTEM AND METHOD FOR DETECTING MALICIOUS MOBILE PROGRAM CODE

(75) Inventor: Christoph Alme, Paderborn (DE)

(73) Assignee: McAfee, Inc., Santa Clara, CA (US)

( * ) Notice: Subject to any disclaimer, the term of this patent is extended or adjusted under 35 U.S.C. 154(b) by 1441 days.

(21) Appl. No.: 11/738,703

(22) Filed: Apr. 23, 2007

(65) Prior Publication Data

US 2008/0263659 A1    Oct. 23, 2008

(51) Int. Cl.

| G06F 11/00 | (2006.01) |
| G06F 12/16 | (2006.01) |
| G06F 12/14 | (2006.01) |
| G08B 23/00 | (2006.01) |
| H04L 29/06 | (2006.01) |
| G06F 21/56 | (2013.01) |

(52) U.S. Cl.
CPC .............. *H04L 63/145* (2013.01); *G06F 21/56* (2013.01); *G06F 2221/2115* (2013.01); *G06F 2221/2119* (2013.01); *H04L 63/0236* (2013.01)

(58) Field of Classification Search
CPC .......... H04L 63/145; H04L 63/1441–63/1483; H04L 63/12; H04L 63/123; H04L 63/126; H04L 51/12; H04L 51/34; H04L 51/585; G06F 21/50; G06F 21/56–21/568; G06F 17/30864; G06F 2221/2119
USPC ..................................................... 726/22, 24
See application file for complete search history.

(56) References Cited

U.S. PATENT DOCUMENTS

| 6,085,229 | A  | * | 7/2000  | Newman et al. ............... 709/203 |
| 6,615,242 | B1 | * | 9/2003  | Riemers ................ H04L 12/585 |
|           |    |   |         | 709/206 |
| 7,421,498 | B2 | * | 9/2008  | Packer .............. G06F 17/30867 |
|           |    |   |         | 707/E17.109 |
| 2004/0088570 | A1 | * | 5/2004  | Roberts et al. ................ 713/201 |
| 2006/0075468 | A1 | * | 4/2006  | Boney et al. ....................... 726/2 |
| 2006/0075494 | A1 | * | 4/2006  | Bertman ............... G06F 21/552 |
|           |    |   |         | 726/22 |
| 2006/0075500 | A1 |   | 4/2006  | Bertman et al. |
| 2006/0190561 | A1 | * | 8/2006  | Conboy et al. ................ 709/217 |
| 2006/0253578 | A1 |   | 11/2006 | Dixon et al. |
| 2007/0083929 | A1 | * | 4/2007  | Sprosts et al. .................. 726/22 |
| 2007/0240217 | A1 | * | 10/2007 | Tuvell et al. .................... 726/24 |
| 2008/0133540 | A1 | * | 6/2008  | Hubbard ............... H04L 63/101 |
|           |    |   |         | 1/1 |

FOREIGN PATENT DOCUMENTS

| EP | 1510945 A1 | 3/2005 |
| EP | 1613010 A2 | 6/2007 |
| WO | WO-2006/099282 A2 | 9/2006 |

OTHER PUBLICATIONS

"European Application Serial No. 08154997.4, European Search Report mailed Aug. 27, 2008", 9 pgs.
European Application No. 08154997.4, Summons to Attend Oral Proceedings Received mailed May 31, 2010, 4 pgs.
European Application No. 08154997.4, Communication Pursuant to Article 94(3) EPC, mailed May 20, 2009, 1 pg.

* cited by examiner

*Primary Examiner* — Ashok Patel
*Assistant Examiner* — Daniel Potratz
(74) *Attorney, Agent, or Firm* — Blank Rome LLP

(57) ABSTRACT

A system and method of detecting malware. A program file is received and analysis performed to identify URLs embedded in the program file. The URLs are categorized as a function of a URL filter database and a malware probability is assigned to each URL identified. A decision is made on how to dispose of the program file as a function of the malware probability of one or more of the URLs identified. In one example approach, a malware type is also assigned to the program file as a function of one or more of the URLs identified.

16 Claims, 3 Drawing Sheets

SYSTEM AND METHOD FOR DETECTING MALICIOUS MOBILE PROGRAM CODE

BACKGROUND OF THE INVENTION

1. Field of the Invention

The present invention is related to computer network security, and more particularly, to a system and method for detecting malicious program code.

2. Background Information

Increased access to the Internet has had the unintended effect of increasing the reach of software programs that capture personal information of users without their informed consent ("Spyware") or that corrupt computers without the user's knowledge and informed consent ("Malware"). In addition, a cottage industry has arisen in software that automatically downloads and displays advertising while an application is being used ("Adware").

Adware primarily comes bundled with no cost ("freeware") or low cost ("shareware") programs. In the past network administrators have used URL filters to block access to URLs in the 'Adware' or 'Spyware' category, but many allow access to categories in the URL filter product labeled 'Shareware', 'Web Hosting', etc. Thus, the network administrator can only partially protect network users from adware and spyware; the download of the hosting freeware or shareware executable will be allowed, but after installation, its outbound connections to the Ad servers will be forbidden by the URL filter. No ads will be shown but the adware program is still installed and may cause system instability or, other, undesired behavior on the part of the hosting application (and/or the web browser).

Adware and spyware can also be retrieved indirectly through a so-called "downloader" malware, a small malware stub that, upon successful infection of a client, downloads the actual (and bigger) malware that it wants to run on its host. Downloaders are often spread via E-mail, but could also reach the client by visiting a prepared web site with a vulnerable web browser. Once more, the delayed download of the actual adware or spyware may be blocked, but the initial infection is not prevented if the Anti Virus vendor has not yet distributed the signatures required to detect the (maybe new) downloader variant.

In addition, access to, or monitoring of access to, certain URL categories may be permitted in some situations but forbidden in others, depending on the host application that performs such action. For example, access to an online-banking site is valid when done from within the end-user's web browser, but the grant of access to, or the monitoring of access to such a sensitive site is suspicious when done from within some mobile code that the end-user downloaded. Such activity may indicate the presence of a keylogger, "password-stealer" or other form of spyware.

"Mobile code" refers to any runnable program code that can be downloaded from the internet via any web protocol, and will be executed on the downloading client later—either automatically (for example, a script or applet embedded into an HTML page) or manually (for example, a Windows executable downloaded by the user).

Past mechanisms for limiting the downloading of malicious mobile code included the use of a signature-based Anti-Malware solution. Such a solution detects known adware or spyware programs or programs infected with known adware or spyware programs. Such an approach is, however, solely a reactive measure.

A second approach is to forbid end-users from downloading any mobile code. Such an approach increases helpdesk calls, however, as users seek to whitelist required program downloads.

What is needed is a system and method for limiting the downloading of adware, spyware and malicious mobile code.

DETAILED DESCRIPTION OF THE INVENTION

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Figure 1:
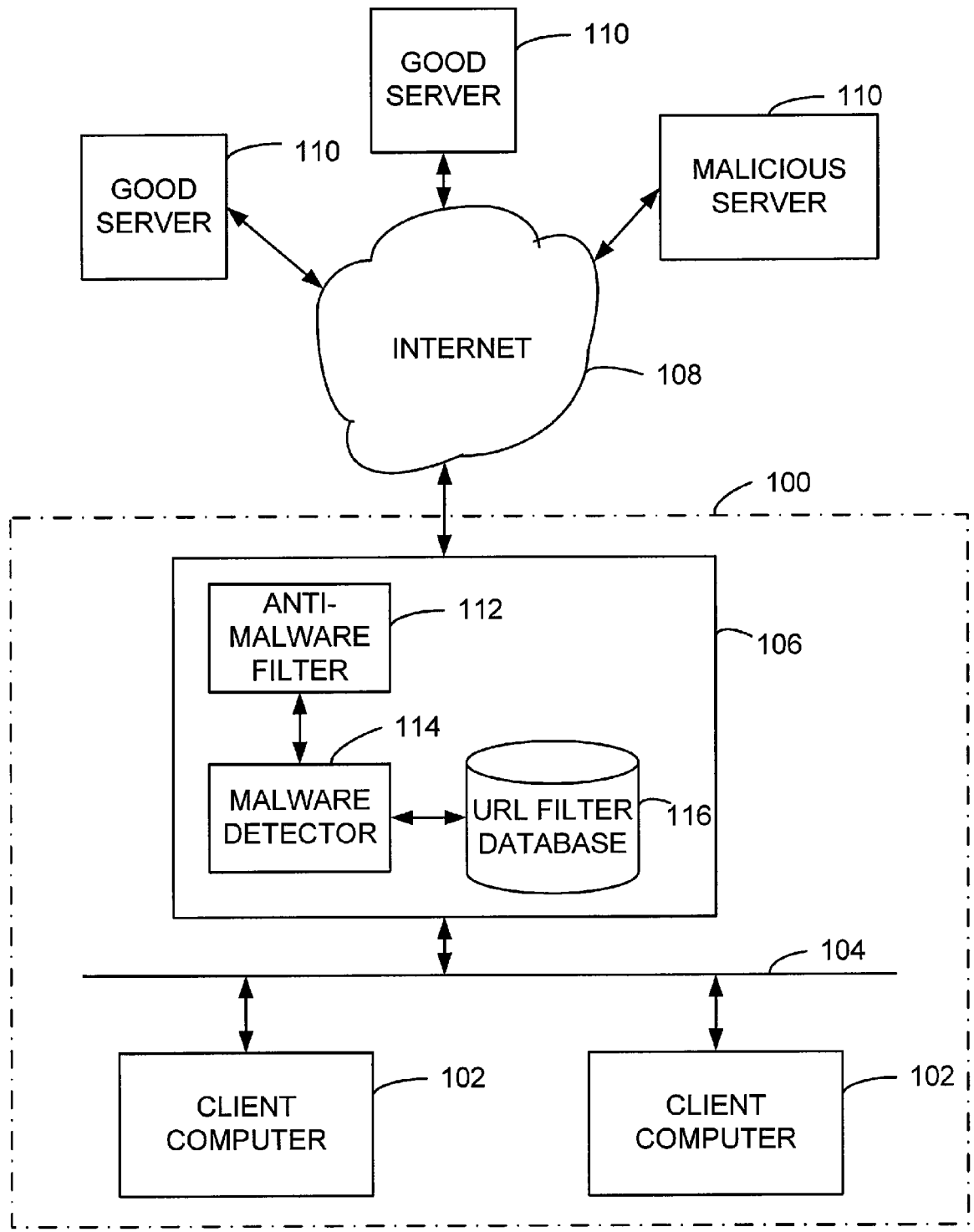
FIG. 1 illustrates a system having gateway that detects malware.

A system 100 for limiting the downloading of adware, spyware and malicious mobile code is shown in FIG. 1. In system 100 of FIG. 1, one or more client computers 102 are connected through a local area network 104 to a gateway 106, and through gateway 106 to Internet 108. Client computers 102 communicate with servers 110 through Internet 108.

In the embodiment shown, one or more servers 110 contain malicious program code, such as Adware, spyware or malware. A server that contains, or is addressed by, malicious program code will be termed a "malicious" server.

In one embodiment, system 100 limits the downloading of adware, spyware and malicious mobile code by installing a gateway 106 at the network perimeter, and directing all web traffic (HTTP(S), FTP, SMTP, and other protocols) from the client computers 102 (including desktop computers/workstations and servers, such as E-mail servers for example) to gateway 106. That is, all client computers 102 are to be served solely by this gateway 106. In one embodiment, each gateway 106 includes a cluster of several gateway instances.

In the embodiment shown in FIG. 1, gateway 106 includes an anti-malware filter 112, a URL filter database 116 and a malware detector 114 connected to the anti-malware filter 112 and the URL filter database 116. The malware detector 114 performs behavioral analysis on the program file to identify URLs, categorizes the URLs as a function of the URL filter database 116 and assigns a malware probability based on the URL categories. The anti-malware filter 112 decides, based on the malware probability, how to dispose of the program file.

In one embodiment downloaded program code is reviewed. In one embodiment, a list is created of the URLs the program code will access at run-time (e.g. after installation on client computer 102) and the URLs the program code will monitor at run-time. Gateway 106 then looks up these URLs in its URL filter database and classifies or blocks the download of the program code according to the categories of the URLs embedded in it.

In one embodiment, gateway 106 scans the downloaded mobile code and determines the URLs which may be accessed by or monitored by the mobile code later or at run-time. It then classifies the downloaded mobile code according to categories assigned to the discovered URL(s) and assigns a malware probability based on the category of that URL. If two or more URLs are found, a malware probability is calculated as a function of the malware probability of each URL.

In one embodiment, no list of URLs is created. Instead, whenever a URL is found during a scan of the program code, it is checked in the URL filter database and a malware probability assigned based on the category of that URL. Scanning then continues until no more URLs are found. Again, if two or more URLs are found, a malware probability is calculated as a function of the malware probability of each URL.

Figure 2:
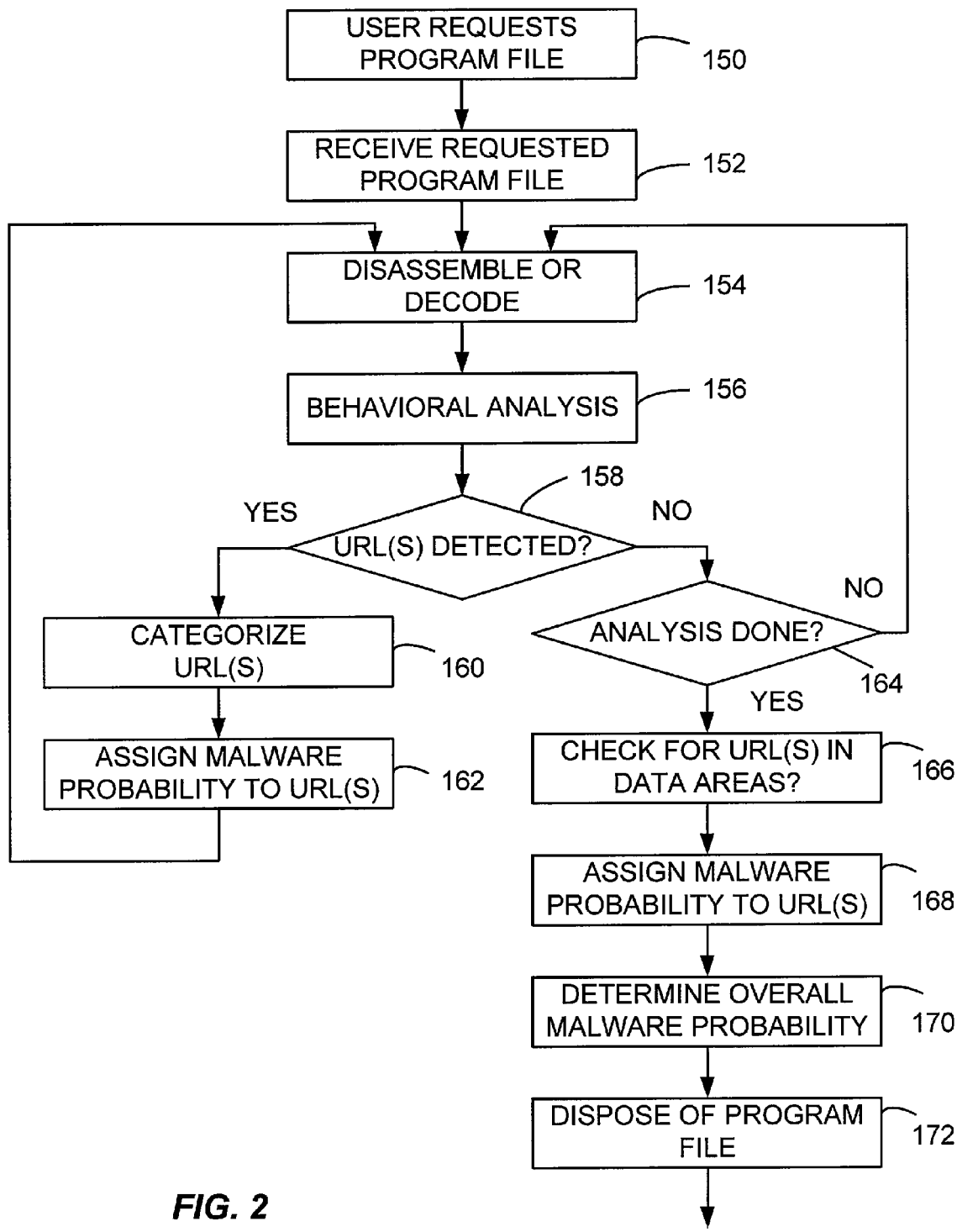
FIG. 2 illustrates a method of detecting malware by categorizing embedded URLs.

An example embodiment is shown in FIG. 2.

In the example embodiment of FIG. 2, a user requests a program file at 150. This may be through, for instance, a browser request for a program file. The program file may be an executable, applet or other mobile code.

At 152, the program file arrives at malware detector 114. Malware detector 114 first statically unpacks the mobile code if necessary. Unpacking may be necessary if the program file is, for example, a self-extracting Windows executable (ZIP, RAR, . . . ), a runtime-packed Windows executable (UPX, FSG, MEW, . . . ) or a Java archive (JAR).

At 154, detector 114 disassembles native or byte code, or decodes the script code, found in the inspected mobile code. Control then moves to 156, where detector 114 performs static or dynamic behavioral analysis, or both, to detect URLs embedded in the program file.

In one static behavioral analysis embodiment, disassembly/decoding continues as long as potential function call contexts, or behavior patterns, are found. A function call context is the invocation of a system or an API call together with the parameters passed along with that call.

In one static behavioral analysis embodiment, at 156, detector 114 determines potential function calls and their parameters. The parameter check may include, for example, a check at 156 to determine if any of the parameters is a string (in the usual mobile code language-specific encodings, such as zero-terminated ASCII or UTF-16LE) and if that string looks like a potential URL (e.g., starts with a known protocol scheme prefix like 'http://', or with 'www.', or contains a known top-level domain optionally followed by a slash or colon like '.com/', etc.).

If dynamic behavioral analysis is desired, detector 114 emulates at 156 all disassembled/decoded code. Emulation also allows detector 114, for example, to generically unpack runtime-packed or encrypted Windows executables regardless of the packing or encryption algorithm used.

A check is made at 158 to see if any potential URLs have been found. If so, control moves to 160, where detector 114 looks up its categories in the URL filter database at and maps the found URL category or categories (a URL could be assigned multiple categories) to a malware probability at 162. Control then moves to 154.

In one embodiment, gateway 106 also includes the option to propose a malware type. The combination of a malware type and malware probability can be used by anti-malware filter 112 to more finely tune its malware filter.

One approach that can be used to assign malware probability and malware type is described in the discussion of FIG. 3 below.

Depending on the category, the malware probability can be raised (or lowered) when the function call is (or is not) a known network access function (such as WinInet API functions, or Socket API functions, etc.). The malware probability derived from this mapping scheme is then added to an overall malware probability maintained by the calling heuristic Anti-Malware filter, for example using Bayes' formula. The download is blocked, or replaced by a warning page, when this overall probability exceeds a configurable threshold.

A check is made at 158 to see if any. If no potential URLs have been found at 158, control moves to 164, and then to 154 (disassembly/decode) and analysis 158 until all program code has been inspected.

In one embodiment, malware detector 114 can be configured to find at 166 potential URLs in areas of the inspected program that are known for containing data.

This is an alternate form of static analysis. The analysis may be, for example, in a Windows executable's initialized data section or string-table resources, in a Java applet's or application's constant string objects or UTF8 string values in its constant pool, etc. The search can be performed by using a string searching algorithm, such as Boyer-Moore, to detect any occurrences of the URL indicators listed above in the discussion of URL occurrences in function calls.

Areas that contain data that does not directly relate to the program code should be either ignored or be processed with lower malware probabilities. For example, data areas containing digital signature information should not be processed as they will contain trustworthy URLs such as 'www.verisign.com', which is also in the 'Web Hosting/IT Services' category.

Detector 114 then looks up the categories of any URLs found at 166 in the URL filter database and maps the found URL categories to a malware probability at 168. In one example embodiment, detector 114 also can be configured to propose a malware type as noted above.

Finally, at 170, malware detector 114 determines an overall malware probability based on the malware probabilities of all URLs found to be embedded in the program file.

In one embodiment, malware detector 114 determines a probable malware type as well. In one such embodiment, malware detector 114 determines an overall malware type to be assigned to the program file simply by taking the first best mapping it makes. For example, an executable may have embedded URLs of contradictory categories, like one URL categorized as "Pornography" and another categorized as "Online Banking". In one embodiment, malware detector 114 assigns a malware type of either "Dialer" or "Keylogger", respectively, depending on which URL is found first.

In another embodiment, one or more URL categories are assigned both a malware type and a probability that URLs in that category are associated with that type of malware. For each URL identified, malware detector 114 looks at the probability that URLs in that category are associated with that type of malware and selects as the overall malware type the malware type of the first URL with a probability above some predefined threshold.

In another embodiment, malware detector 114 calculates a probability "on the fly" and, again, selects as the overall malware type the malware type of the first URL with a probability above some predefined threshold.

In yet another embodiment, malware detector 114 looks at all probable malware types and their associated probability values and selects the best fit.

At 172, anti-malware filter 112 delivers the program file, sends a warning page instead or blocks the download, depending on the overall malware probability and/or malware type and the user's, e.g. the network administrator's, configuration.

Figure 3:
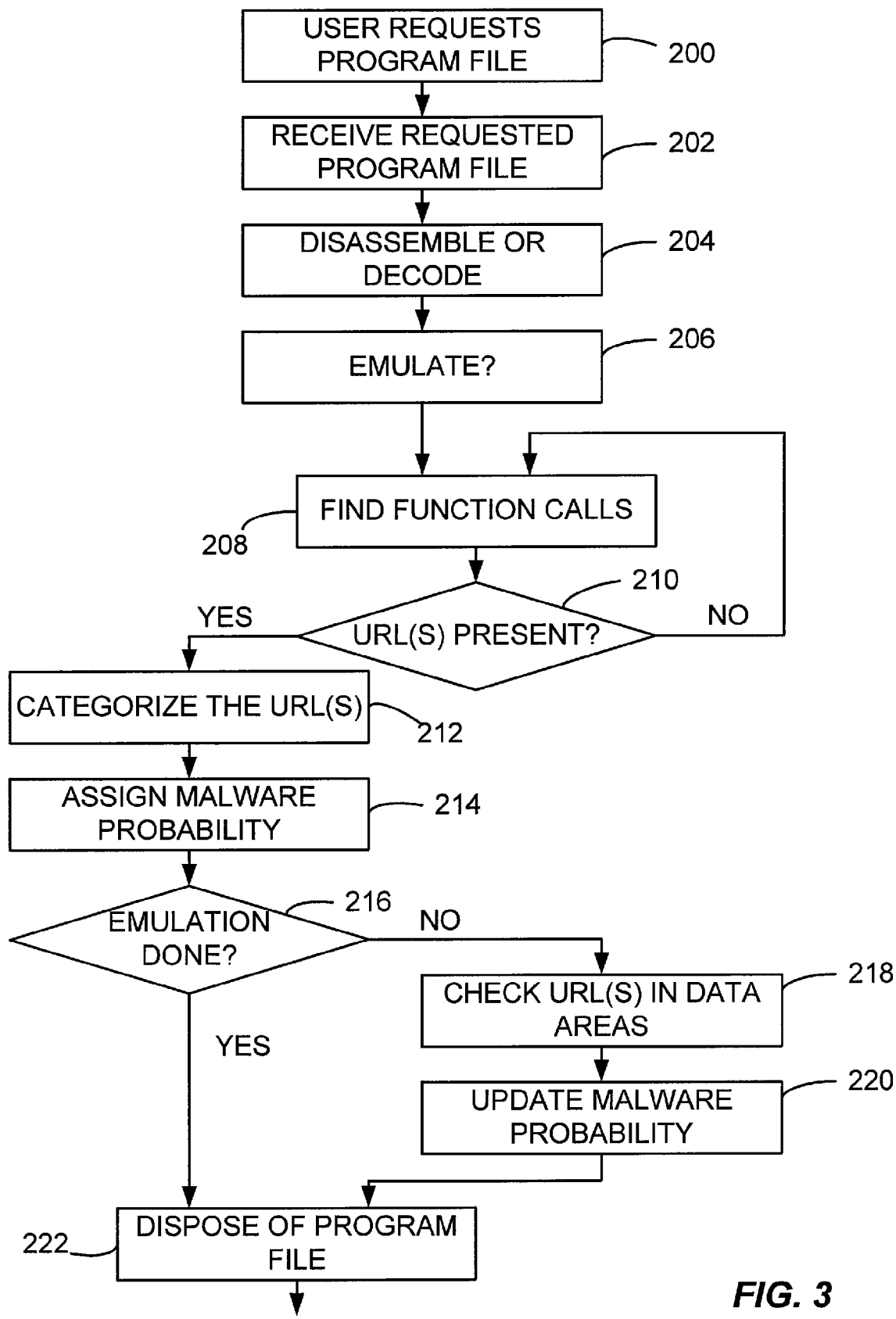
FIG. 3 illustrates another example embodiment of a method of detecting malware by categorizing embedded URLs.

Another embodiment of gateway 106 is shown in FIG. 3. In the example embodiment of FIG. 3, a user requests a program file at 200. This may be through, for instance, a browser request for a program file. The program file may be an executable, applet or other mobile code.

At 202, the program file arrives at filter 112, which transfers the program file to malware detector 114. Detector 114 first statically unpacks the mobile code if necessary. Unpacking may be necessary if the program file is, for example, a self-extracting Windows executable (ZIP, RAR, . . . ), a runtime-packed Windows executable (UPX, FSG, MEW, . . . ) or a Java archive (JAR).

At 204, malware detector 114 disassembles native or byte code, or decodes the script code, found in the inspected mobile code. For static behavioral analysis (e.g. without emulation), this disassembly/decoding continues as long as a potential function call contexts, or behavior patterns, are found. A function call context is the invocation of a system or an API call together with the parameters passed along with that call.

If dynamic behavioral analysis is desired, malware detector 114 emulates at 206 all disassembled/decoded code. Such an approach allows malware detector 114, for example, to generically unpack runtime-packed or encrypted Windows executables regardless of the packing or encryption algorithm used.

At 208, malware detector 114 determines potential function calls and their parameters.

For each potential function call and its associated parameter values found, check at 210 if any of the parameters is a string (in the usual mobile code language-specific encodings, such as zero-terminated ASCII or UTF-16LE) and if that string looks like a potential URL (e.g., starts with a known protocol scheme prefix like 'http://', or with 'www.', or contains a known top-level domain optionally followed by a slash or colon like '.com/', etc.).

If any such potential URL is found, look up its categories in the URL filter database at 212 and map the found URL categories (a URL could be assigned multiple categories) to a malware probability at 214. In one such embodiment, detector 114 also includes the option to propose a malware type such as the following (category names are exemplary):

If the URL is categorized as 'Pornography' or the like, map to a high malware probability and propose 'Dialer' as the malware type.

If the URL is categorized as 'Banking/Finances' or the like, and the scanned mobile code is not being downloaded from a site categorized as 'Banking/Finances' or the like, map to a high malware probability and propose 'Keylogger' or 'Password-Stealer' as the malware type.

If the URL is categorized as 'Spyware', map to a high malware probability and propose 'Spyware' as the malware type.

If the URL is categorized as 'Adware', map to a medium or high malware probability (depending on configuration) and propose 'Adware' as the malware type.

If the URL is categorized as 'Malicious Web Sites', 'Computer Crime', 'Warez' or the like, map to a high malware probability.

If the URL is categorized as 'Web Hosting' or 'Private Homepages', map to a low malware probability.

In one embodiment, if access to URLs in the found category has been configured to be blocked by the user, e.g. network administrator, propose to warn on the download. In another embodiment, if access to URLs in the found category has been configured to be blocked by the user, block the download.

If the URL is not in a category, then detector 114 reviews the potential URL string to verify if the string is in all likelihood a valid URL. In one embodiment, malware detector 114 verifies whether a potential URL string does in fact denote a URL using a statistic method to check whether the string looks "reasonable" enough to be a URL. For example, malware detector 114 could simply count alphanumeric chars and non-alphanumeric chars, and define a threshold for their ratio, so that, for example a string like:
  http://A$5/3f!Xe$%.com/5d&%$
is treated as garbage, while a string like:
  http://somedomain.com/somepath
is treated as a valid URL string.

In one embodiment, gateway 106 can be configured to probe servers associated with what appear to be valid URLs. To do this, gateway 106 attempts to contact the server in order to request the particular URL. In one such embodiment, gateway 106 tries to establish a connection to the specified host in order to request the URL (if a client for the required protocol is implemented). In one embodiment, gateway 106 can only perform this type of investigation for a limited, but configurable, number of uncategorized URLs.

If during the investigation the DNS lookup for the specified host fails, detector 114 maps to a low malware probability and proposes 'Downloader' as the malware type (the domain name may be reserved for future use by a downloader component and/or the actual malware may not yet have been "activated").

If an HTTP response with status code 404 ("Not Found") is returned and the URL was ensured to be complete, e.g. including path and parameters if applicable, then detector 114 maps to a low malware probability and proposes 'Downloader' as the malware type.

If any content is returned, and its media type points to potential mobile code such as a Windows executable or Cabinet archive (CAB), then detector 114 maps to a medium malware probability and proposes 'Downloader' as the malware type.

In one such embodiment, if any content is returned, depending on its media type, detector 114 applies a configurable set of filters onto the delivered content, up to a configurable recursion depth. Detector 114 then maps to a respective malware probability and proposes a malware type based on the filters' result.

In one embodiment, detector 114 uses aggressive timeouts, thresholds, and anonymization where possible to reduce the ability of attackers to recognize gateway 106 (for example, as a preparatory step for a product-specific attack) or to perform Denial of Service attacks against it.

If the URL is not categorized, and access to uncategorized sites is configured to be blocked, then thoroughly check if the potential URL string is really a valid URL. If the URL is in all likelihood a URL, in one embodiment, gateway 106 proposes to warn on the download. In another embodiment, filter 112 proposes to block the download.

Depending on the category, the malware probability can be raised (or lowered) when the function call is (or is not) a known network access function (such as WinInet API functions, or Socket API functions, etc.). The malware probability derived from this mapping scheme is then added to an overall malware probability maintained by the calling heuristic Anti-Malware filter, for example using Bayes' formula. The download is blocked, or replaced by a warning page, when this overall probability exceeds a configurable threshold.

Continue with 204 (Disassembly) until all program code has been inspected.

In one embodiment, detector 114 tries at 218 to find potential URLs in areas of the inspected program that are known for containing data. This may be done in place of, or in addition to, emulation at 206. This analysis may be performed, for example, in a Windows executable's initialized data section or string-table resources, in a Java applet's or application's constant string objects or UTF8 string values in its constant pool, etc. The search can be performed by using a string searching algorithm, such as Boyer-Moore, to detect any occurrences of the URL indicators listed above in the discussion of URL occurrences in function calls.

Areas that contain data that does not directly relate to the program code should be either ignored or be processed with lower malware probabilities. For example, data areas containing digital signature information should not be processed as they will contain trustworthy URLs such as 'www.verisign.com', which is also in the 'Web Hosting/IT Services' category.

Detector 114 then looks up the categories in the URL filter database and maps the found URL categories to a malware probability at 220 and, optionally, proposes a malware type, similar to the process described above.

Finally, at 222, anti-malware filter 112 delivers the program file, sends a warning page instead or blocks the download, depending on the overall malware probability and the user's, e.g. the network administrator's, configuration.

The approach discussed above allows the network administrator to block adware and spyware—and other mobile code that potentially accesses, or monitors access to, unwanted or sensitive URL categories. The program code is intercepted when it (or its hosting application) is being downloaded, rather than (if at all) blocking only its communications after it has infected a client. Thereby, the initial malware infection of the client can be avoided.

In contrast to the past approaches, this solution is not solely reactive, as it can also detect new, yet unknown variants of malware as long as its addressed URLs are known. In addition, it does not require to block downloading of all mobile code, making it easier to maintain. Furthermore, it protects earlier, e.g. against the initial infection, rather than only blocking the communication of an infected client, does not need to care about how to clean the infection on a client and does not require client-side deployment. Finally, it does not need to care about how to protect a client-side component against being disabled by a malware and does not require frequent updates in addition to the maintenance of the URL filter database.

This approach applies the categorization knowledge of a URL filter database onto mobile code content. By using this invention during download of mobile code, one can avoid or mitigate infection of clients with content that addresses unwanted sites, where 'unwanted' can depend on the context from which the site is accessed. For example, access to sites can be blocked anyway so the downloaded program can't operate on the client as intended. In addition, access to or monitoring of sites for which such action should not occur from within a downloaded program (like online-banking sites) is prevented.

In the above discussion, the term "computer" is defined to include any digital or analog data processing unit. Examples include any personal computer, workstation, set top box, mainframe, server, supercomputer, laptop or personal digital assistant capable of embodying the inventions described herein.

Examples of articles comprising computer readable media are floppy disks, hard drives, CD-ROM or DVD media or any other read-write or read-only memory device.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. A method of detecting malware, comprising:
   receiving a program file;
   performing, by a malware detector comprising executable instructions, analysis on the program file to identify a plurality of URLs;
   associating, by the malware detector, a category with each of the plurality of URLs as a function of a URL filter database;
   assigning, by the malware detector, a malware probability and a malware type to each of the plurality of URLs responsive to the category associated with each of the plurality of URLs, wherein the malware type describes a function of malware associated with the category associated with that URL;
   calculating a malware type probability associated with the malware type of each of the plurality of URLs, the malware type probability comprising a probability that URLs in the category associated with that URL are associated with the malware type;
   assigning an overall malware type to the program file corresponding to the malware type of a first URL of the plurality of URLs having a malware type probability that exceeds a predetermined threshold value; and
   deciding how to dispose of the program file based at least in part on the overall malware type of the program file; and
   wherein the malware probability and the malware type of each of the plurality of URLs are assigned without accessing content pointed to by that URL unless that URL is uncategorized by the URL filter database, in which case accessing content pointed to by that URL in order to assign the malware probability and the malware type to that URL.

2. The method of claim 1, wherein performing analysis comprises performing a static behavioral analysis by searching for function calls and identifying any URLs passed with the function calls.

3. The method of claim 1, wherein performing analysis comprises performing dynamic behavioral analysis by emulating code in the program file.

4. The method of claim 1, wherein associating a category with each of the plurality of URLs as a function of a URL filter database comprises:
   determining if a URL is not in the URL filter database and, if the URL is not in the URL filter database, querying a server of the URL for information.

5. A gateway, comprising:
   a hardware processor;
   an anti-malware filter, comprising executable instructions;
   a URL filter database; and
   a malware detector, comprising executable instructions, connected to the anti-malware filter and the URL filter database;
   wherein the malware detector is configured to:
     perform analysis on a program file to identify a plurality of URLs;
     associate a category with each of the plurality of URLs as a function of the URL filter database;
     assign a malware type to each of the plurality of URLs, wherein the malware type describes a function of malware associated with the category associated with that URL;

assign a malware probability to each of the plurality of URLs, based on the category associated with that URL;

calculate a malware type probability associated with the malware type of each of the plurality of URLs, the malware type probability comprising a probability that URLs in the category associated with that URL are associated with the malware type;

assign an overall malware type to the program file corresponding to the malware type of a first URL of the plurality of URLs having a malware type probability that exceeds a predetermined threshold value; and wherein the anti-malware filter is configured to decide, based at least in part on the overall malware type of the program file, how to dispose of the program file, and wherein the malware probability and the malware type of each of the plurality of URLs are assigned without accessing content pointed to by that URL unless that URL is uncategorized by the URL filter database, in which case accessing content pointed to by that URL in order to assign the malware probability and the malware type to that URL.

6. The gateway of claim 5, wherein the analysis of the program file is a static behavioral analysis.

7. The gateway of claim 6, wherein the static behavioral analysis comprises searching for function calls and identifying any URLs passed with the function calls.

8. The gateway of claim 5, wherein the analysis comprises searching for URLs in data areas.

9. The gateway of claim 5, wherein the analysis comprises dynamic behavioral analysis.

10. The gateway of claim 9, wherein the dynamic behavioral analysis comprises emulating code in the program file by the malware detector.

11. The gateway of claim 5, wherein the malware detector is further configured to determine if a URL of the plurality of URLs is not in the URL filter database and, if the URL is not in the URL filter database, query a server for URL information.

12. A non-transitory machine readable medium, on which are stored instructions, comprising instructions that when executed cause a machine to:

identify, by a malware detector, a plurality of URLs in a program file;

associate, by the malware detector, a category with each of the plurality of URLs as a function of a URL filter database;

assign, by the malware detector, a malware probability and a malware type to the URL based at least in part on the category associated with that URL, wherein the malware type describes a function of malware associated with the category associated with that URL;

calculate a malware type probability associated with the malware type of each of the plurality of URLs, the malware type probability comprising a probability that URLs in the category associated with that URL are associated with the malware type;

assign an overall malware type to the program file corresponding to the malware type of a first URL of the plurality of URLs having a malware type probability that exceeds a predetermined threshold value; and determine how to dispose of the program file based at least in part on the overall malware type of the program file, wherein the malware probability and the malware type of each of the plurality of URLs are assigned without accessing content pointed to by that URL unless that URL is uncategorized by the URL filter database, in which case accessing content pointed to by that URL in order to assign the malware probability and the malware type to that URL.

13. The machine readable medium of claim 12, wherein the instructions further comprise instructions that when executed cause the machine to: calculate a malware probability for the program file as a function of the malware probabilities of each of the plurality of URLs.

14. The machine readable medium of claim 12, wherein the instruction that when executed cause the machine to identify a URL in the program file comprise instructions that when executed cause the machine to:

search a data area for a URL.

15. The machine readable medium of claim 12, wherein the instruction that when executed cause the machine to identify a URL in the program file comprise instructions that when executed cause the machine to:

perform a dynamic behavioral analysis of the program file.

16. The machine readable medium of claim 12, wherein the instruction that when executed cause the machine to associate a category with the URL using a URL filter database comprise instructions that when executed cause the machine to:

search for the URL in the URL filter database; and query a server for information associated with the URL responsive to not finding the URL in the URL filter database.

* * * * *